United States Patent [19]

Wilhelm et al.

[11] Patent Number: 5,075,084

[45] Date of Patent: Dec. 24, 1991

[54] PROCESS FOR THE REMOVAL OF IODINE AND IODINE COMPOUNDS FROM HYDROGEN-CONTAINING GASES AND VAPORS

[75] Inventors: Jürgen Wilhelm, Gondelsheim; Lothar Puppe, Burscheid, both of Fed. Rep. of Germany

[73] Assignees: Bayer Aktiengesellschaft, Leverkusen; Kernforschungszentrum Karlsruhe GmbH, Karlsruhe, both of Fed. Rep. of Germany

[21] Appl. No.: 463,107

[22] Filed: Jan. 10, 1990

[30] Foreign Application Priority Data

Jan. 21, 1989 [DE] Fed. Rep. of Germany ....... 3901784
Feb. 6, 1989 [DE] Fed. Rep. of Germany ....... 3903445

[51] Int. Cl.$^5$ .......................... C01B 7/14; B01D 53/02
[52] U.S. Cl. ........................................ 423/241; 55/75; 423/245.1; 423/240
[58] Field of Search ................. 423/240 R, 240 S, 241, 423/245.1; 55/75

[56] References Cited

U.S. PATENT DOCUMENTS

| | | | |
|---|---|---|---|
| 3,356,450 | 12/1967 | Heinze | 423/328 C |
| 3,415,736 | 12/1968 | Ciric | 423/328 C |
| 3,658,467 | 4/1972 | Maeck | 423/240 S |
| 3,838,554 | 10/1974 | Wilhelm et al. | 55/75 |
| 4,088,737 | 5/1978 | Thomas et al. | 423/240 |
| 4,657,748 | 4/1987 | Vaughan et al. | 423/328 T |
| 4,735,786 | 4/1988 | Inoue et al. | 423/240 S |
| 4,913,850 | 4/1990 | Puppe et al. | 423/240 |

FOREIGN PATENT DOCUMENTS

| | | |
|---|---|---|
| 2841565 | 4/1980 | Fed. Rep. of Germany. |
| 1068127 | 4/1986 | Japan ................................. 423/241 |

OTHER PUBLICATIONS

Patent Abstract of Japan, vol. 10, No. 94 (C-338) (2151) Apr. 11, 1986, & JP-A-60 225638 (Nippon Genshiryoku Jigyo K.K.), Nov. 9, 1985.

*Primary Examiner*—Michael Lewis
*Assistant Examiner*—Brian M. Bolam
*Attorney, Agent, or Firm*—Sprung Horn Kramer & Woods

[57] ABSTRACT

A process for the rapid and effective removal of iodine, organic iodine compounds with a small number of carbon atoms or mixture thereof from gases and/or vapors, comprising passing said gas or vapor through an adsorbent bed containing a silver-lead-exchanged zeolite X.

2 Claims, No Drawings

PROCESS FOR THE REMOVAL OF IODINE AND IODINE COMPOUNDS FROM HYDROGEN-CONTAINING GASES AND VAPORS

The invention relates to a process for the rapid and effective removal of iodine and/or organic iodine compounds with a small number of carbon atoms, especially from hydrogen-containing gases and/or vapors with addition of silver-lead-exchanged zeolite X.

For the removal of organic iodine compounds and/or iodine from gases, especially for the removal of radioactive fission-product iodine from atmospheres in nuclear plants, it is known to use active charcoal or active charcoal impregnated with iodine and/or iodide. R.E. Adams, R.D. Ackley; Chapter 2.1: "Trapping of Radioactive Iodine and Methyl Iodide by Iodized Charcoal" in Nuclear Safety Program Annual Progress Report for Period Ending Dec. 31, 1967. ORNL-4228 (Apr. 1968, pp. 99 to 114). Amine-impregnated charcoal is also used.

This adsorbent material is not, however, usable everywhere, since it is combustible and even at relatively low temperatures, for example 150° C., releases the adsorbed iodine again in considerable amounts. If higher temperatures arise in the gas to be purified, or if account has to be taken of a strong heating of the adsorber material through the heat of radioactivity of radioactive fission products, temperature-resistant and incombustible materials must be used.

It was established that fission-product iodine occurs in waste gases of nuclear plants not only in elemental form, but also in the form of organic compounds of low carbon number, for example in the form of radioactive methyl iodide. For this reason, adsorber materials, which should be generally usable, must retain organic iodine compounds also to the same degree.

Other adsorber materials possibly usable for iodine removal under precisely defined adsorption conditions, such as for example silver-impregnated ceramic sintered products (so-called Berl saddles), silver-coated copper turnings or silver-coated silica gel, have little effectiveness or none at all for the retention of methyl iodide and/or they lose their effectiveness on passage of superheated steam. Furthermore impregnated silica gel has the property of absorbing water and thereby losing its strength.

These materials are therefore not usable for general application, i.e. for use in different types of iodine removal plants, possibly under different and even rapidly changing adsorption conditions, for example during or after an accident.

The silver-impregnated formed sorbent particles described in the DE-OS 2 109 146, which consist predominantly of amorphous silicic acid, indeed show high sorption for iodine or iodine compounds and are stable to superheated steam, but they have the disadvantage that the salt impregnation can be leached out under the superheated steam conditions, even at 150° C.

Silver-exchanged molecular sieve zeolites, on the other hand are stable to leaching. Zeolites are aluminosilicate frameworks of the general formula:

$$M_{m/z} [m\ AlO_2\ n\ SiO_2]\ q\ H_2O$$

where $M_{m/z}$ signifies exchangeable cations, [m AlO$_2$ n SiO$_2$] the anionic framework and q H$_2$O the sorbed phase. Suitable zeolites are described for example in D.W. Breck, Zeolite Molecular Sieves, John Wiley & Sons, Inc. New York 1974.

For the iodine sorption, silver-exchanged molecular sieves have been examined already. D.T. Pence, F.A. Duce, W.J. Maeck, Proceedings 12th AEC Air Cleaning Conference, Oak Ridge, Tenn., Jan. 1973, p. 417, J.G. Wilhelm: "Trapping of Fission Product Iodine with Silver-impregnated Molecular Sieves", Saclay, France, 4 to 6 Nov. 1969. Bericht der Gesellschaft für Kernforschung m.b.H., Karlsruhe, No. KFK-1065 (October, 1969). Suitable molecular sieves are sodium aluminosilicates, for example of a composition according to the empirical formula:

$$Na_{86} [(AlO_2)_{86} (SiO_2)_{106}]\ x\ H_2O$$

with the faujasite structure.

During the treatment with silver nitrate, the sodium ions are replaced by silver ions. High separation efficiencies are achieved for methyl iodide and for elementary iodine at high atmospheric relative humidities. According to the state of the art, clay-bonded silver-exchanged granular zeolite materials are used for iodine adsorption. In this way, separation efficiencies of 99.9 % can be achieved. In order to reduce the high costs of the iodine sorption filter it is desirable to achieve higher separation efficiencies. This is attained by passing gases or vapors containing iodine and/or iodine compounds through a bed of a silver-exchanged binder-free molecular sieve of the faujasite structural type. In this way, separation efficiencies of 9.99 % can be achieved.

Silver-exchanged zeolites can, however, under some circumstances catalyze the recombination reaction of hydrogen and oxygen to water. This aspect is above all of decisive importance if hydrogen and oxygen are contained in the iodine-containing gases and/or vapors, or if the presence of hydrogen and oxygen in these gases and/or vapors has to be reckoned with.

Dehydrated silver zeolites are hydrated by water vapour. This hydration is a slightly exothermic reaction and leads to a heating of the zeolite, which is desirable in itself, since temperatures below the dewpoint are hereby ruled out.

It was, however, observed that even at a zeolite temperature of 65° C. the limit temperature is reached, but it is that at which the catalytic recombination of hydrogen and oxygen occurs. Through this reaction the zeolite is heated further, through which the reaction of hydrogen and oxygen is again favoured. The temperature of the zeolite can rise to the ignition temperature of hydrogen.

The invention is therefore based on the problem of developing an improved process which avoids the disadvantages of the processes operated with the adsorber materials known hitherto and ensures a rapid, effective removal of iodine and/or organic iodine compounds with a small number of carbon atoms, even from hydrogen-containing gases and/or vapors, from nuclear plants, at differing, rapidly changing and possibly extreme operating conditions during or after an accident.

By the invention the problem is solved by passing the gases or vapors containing the iodine and/or iodine compounds through a bed of a molecular sieve of the faujasite structural type which has been exchanged with silver and at least one other heavy metal and is preferably free of binder, advantageously through a bed of loosely packed formed particles of sorbent (granules such as beads, small rods, grains or fragments). A further advantageous embodiment of the invention is the passing of the gases and vapors through porous formed bodies, formed from sorbent particles, especially spheres, such as through porous plates, porous cylinders or porous hollow bodies. Advantageously, lead is used as the further heavy metal. The silver-lead-exchanged sorbents to be used for the execution of the process consist of spherical particles or particles in the form of granules such as small rods, grains or fragments, a few millimetres in diameter or length, which contain 80-90% zeolite X and 10-20% zeolite A. Binder-containing silver-lead-exchanged zeolites are also suitable.

The granular materials exhibit a high average mechanical strength of >60 N at a diameter of 2-4 mm.

Furthermore the granular material according to the invention is insensitive with regard to the effect of water vapor on the adsorption performance. Especially suitable as starting material for the granular sorbent materials is a binder-free molecular sieve granular material of the faujasite structural type, which has been prepared as a spherical granular material following the processes described in the DE-OS 3 401 485 and DE-OS 1 203 238.

The ion exchange with silver salt solutions is carried out according to the state of the art. For silver exchange the exchange equilibrium lies on the zeolite side, and the exchange can therefore be carried out advantageously even at room temperature. Also the amount of silver required is exchangeable in a single exchange. The degree of silver exchange can be between 0.1 and 0.95 and the degree of lead exchange correspondingly between 0.05 and 0.9. Preferably the zeolite contains so much silver that a high iodine sorption capacity is assured and so much lead that no catalytic reaction with the hydrogen in the atmosphere can occur. Preferably the Pb component amounts to 10 to 80% of the exchanged ions.

A zeolite is used with the following formula in oxide form:

$a\,Na_2O \cdot b\,PbO \cdot c\,Ag_2O \cdot Al_2O_3\,2.5\pm0.5\,SiO_2$ $b = 0.05-0.9$
$c = 0.1-0.95$
$a + b + c = 1$.

After the ion exchange the material is activated in the air stream. Usual activation temperatures are between 400° and 500° C.

In the following the invention is explained by some experimental results in the form of examples.

EXAMPLE 1

30 kg of sodium zeolite X with a water content (ignition loss) of 25% were processed in the intensive mixer with addition of 15 l 30% silica sol with a BET value of ca. 300 m²/g to a granular material of particle size ca. 0.1-0.7 mm. This initial granular material was fed to a pan granulator.

Then finely powdered zeolite X was charged to the rotating granulator by continuous dosing, while simultaneously the 30% silicic acid sol was sprayed at another point of the granulator onto the moving granules. A stream of water glass was mixed via an injection device with the silica sol, so that a ratio of sol to water glass of 9:1 was set up. A 2-4 mm spherical granular material was obtained.

5 kg of the above granular silica-gel-bonded faujasite material with a water content of 35% with respect to the water-free granular material and with a grain size of 2-4 mm was charged to a rubber-lined vessel with sieve trays. An aqueous alkaline sodium aluminate solution was recirculated through the bed of granules by pumping. For the preparation of this aluminate solution, 2.4 kg of alumina hydrate (with 65% $Al_2O_3$) had been dissolved in 4.5 l of 45% aqueous caustic soda solution (density 1.48) at the boiling point and the clear solution obtained then diluted with 33 litres water. The aluminate treatment was first carried out overnight (15 hours) at ambient temperature. Then the circulating aluminate solution was warmed to 45° C. by a heat exchanger installed in the alkaline solution circuit and pumped round for 5 hours; then the temperature was maintained for a further 3 hours at 80° C.

The granules of completely crystalline mixed zeolite obtained were washed with water to a pH of 9 to 10 for the wash water run-off and then dried.

According to the X-ray diffraction analysis the granules consisted of about 80 to 85% of Na faujasite in addition to sodium zeolite A.

EXAMPLE 2

1285 g of the granular material described in Example 1 but not yet activated were charged to a darkened column, 3000 ml of a lead nitrate solution containing 170 g of lead nitrate were added, and the solution was pumped round for 8 hours. At the end of the exchange, lead could no longer be detected in the exchange solution. Next the material was exchanged with 3000 ml of a silver nitrate solution containing 281 g $AgNO_3$. The granular material was washed with deionized water, dried at 110° C. and then activated in the hot air stream at 450° C.

EXAMPLE 3

For investigation of the catalytic properties of the Ag,Pb zeolite, a mixture of 15% $H_2$, 28% $H_2O$ vapor and 57% air was passed at a temperature of 200° C. and a gas velocity of 30 cm/s through a test filter 2.5 cm in diameter and 5 cm thick for 20 h. No measurable heating of the zeolite bed occurred through the $H_2/O_2$ reaction, whereas by the use of pure Ag zeolites temperature rises of up to several hundred degrees C. were observed. Even an increase of the residence time of the $H_2$-containing gas mixture to 3 times its initial value led to no heat evolution.

A catalytic reaction leading to the ignition of the hydrogen in the area of the components passing the effluent gas, which would prohibit the use of the sorbent, can therefore be excluded.

EXAMPLE 4

For investigation of the adsorptionperformance of the Ag, Pb-zeolite, a test filter of 2.5 cm diameter and 5 cm thickness was conditioned for 0.5 h with a steam-air mixture of volume ratio 2.7:1 at a linear gas velocity of 31 cm/s, a temperature of 146° C. and a pressure of about 1 bar. Then elemental radio-iodine, labelled with I-131, was added to the indicated gas stream for a period of 0.5 h. After the end of this addition, the indicated gas stream was maintained for a further 1.5 h. The iodine removal in the test filter was determined by measurement of the iodine activity in sections of the filter and in impregnated active charcoal beds inserted downstream (for the removal of radio-idoine). The following test results were produced:

| bed thickness (cm) | 5 | 7.5 |
| --- | --- | --- |
| residence time (s) | 0.16 | 0.24 |
| adsorption efficiency (%) | 99.58 | 99.76 |
| decontamination factor | 2400 | 4200 |

What is claimed is:

1. In a process for the removal of iodine, organic iodine compounds, or mixtures thereof from a gas containing hydrogen and oxygen, said process comprising passing said gas through a bed of sorbent particles and adsorbing the iodine or iodine compounds; the improvement comprising passing said gas through a bed of granular silver-lead exchanged faujasite structure molecular sieve material having the formula $$a\, Na_2O \cdot b\, PbO \cdot c\, Ag_2O \cdot Al_2O_3\, 2.5+0.5\, SiO_2$$

wherein
 $b=0.05-0.9$,
 $c=0.1-0.95$, and
 $a+b+c=1$,
thereby substantially reducing any heating due to hydrogen/oxygen reaction.

2. A process according to claim 1, wherein the granular material is a binder-free granular silver-lead-exchanged molecular sieve material.

* * * * *